Figure 3:
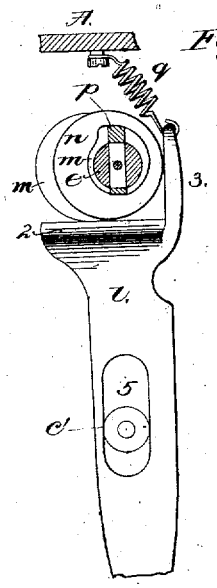

2 Sheets—Sheet 1.
E. T. THOMAS.
Assignor to C. W. WILLIAMS MANUFACTURING COMPANY, now known as the WILLIAMS MANUFACTURING COMPANY.
SEWING MACHINE.
No. 10,269. Reissued Jan. 9, 1883.
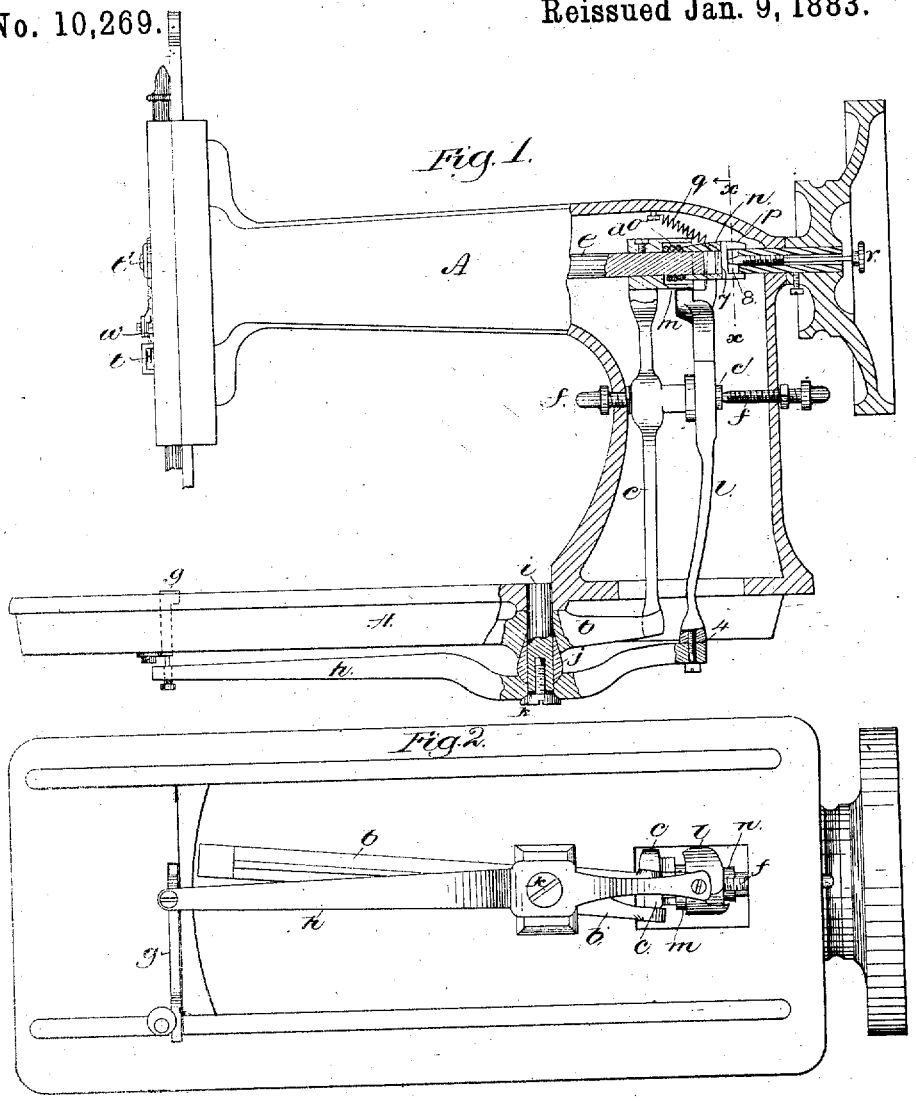
Witnesses.
Fred A. Powell.
John F. E. Rinkert
Inventor:
Eddy T. Thomas
by Crosby Gregory Attys.

E. T. THOMAS.

Assignor to C. W. WILLIAMS MANUFACTURING COMPANY, now known as the WILLIAMS MANUFACTURING COMPANY.

SEWING MACHINE.

No. 10,269. Reissued Jan. 9, 1883.

Witnesses.
Fred A. Powell.
Thos P. C. Prindle

Inventor:
Eddy T. Thomas
by Crosby & Gregory
Attys.

UNITED STATES PATENT OFFICE.

EDDY T. THOMAS, OF NEW YORK, N. Y., ASSIGNOR TO C. W. WILLIAMS MANUFACTURING COMPANY, NOW KNOWN AS THE WILLIAMS MANUFACTURING COMPANY, OF MONTREAL, CANADA.

SEWING-MACHINE.

SPECIFICATION forming part of Reissued Letters Patent No. 10,269, dated January 9, 1883.

Original No. 248,530, dated October 18, 1881. Application for reissue filed November 28, 1882.

*To all whom it may concern:*

Be it known that I, EDDY T. THOMAS, of New York, county and State of New York, have invented a new and useful Improvement in Sewing-Machines, of which the following description, in connection with the accompanying drawings, is a specification.

This invention in sewing-machines relates to improvements in mechanism for operating the feed, also to means for adjusting the strength of the spring controlling the take-up, and also to combinations of mechanical elements or devices, hereinafter described, and particularly pointed out in the claims, whereby the feed and shuttle are moved positively and in the proper time and order. The feed is regulated to control the length of stitch by means of an adjusting or regulating device (shown as a screw) carried by the rotating shaft, which, at the front end, actuates the needle-bar and needle. This feed-adjusting device acts upon and moves longitudinally on the said shaft a conical cam, so that a portion thereof of greater or less radius will act upon an arm of an upright lever and vibrate the same a greater or less distance, a second cam on the same shaft moving the said upright lever longitudinally, thus imparting to the said upright lever such movements as to enable it to move a horizontal universally-pivoted feed-lever in such direction that its front end, in engagement with the usual feed-bar, will raise and move the said bar forward, a suitable spring (not shown) moving the said feed-bar downward and backward, as now common, when the said bar is permitted so to be moved. The horizontally-vibrating shuttle-carrying lever is pivoted upon a stud attached to the under side of the bed-plate of the machine, the said stud also serving as the pivot for the horizontally-vibrating feed-actuating lever, moved by a vibrating vertical lever deriving its movement from a cam on the main driven shaft of the machine. The take-up arm, pivoted at the face of the head-covering plate, is acted upon by one end of a coiled flat spring, the other end of which is engaged with an adjusting-lever having its center of motion coincident with that of the take-up lever, the adjusting-lever being shaped to co-operate with a notched lever-holding bar, also secured to the said plate.

Figure 4:
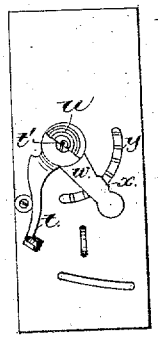
Figure 5:
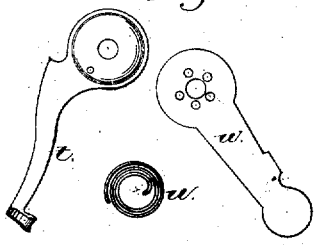

Figure 1 represents in side elevation and partial section a sufficient portion of a sewing-machine to illustrate my present invention; Fig. 2, an under side view of Fig. 1; Fig. 3, a sectional detail on the dotted lines *x x*, Fig. 1; Fig. 4, a front view of the head-covering plate and attached take-up; and Fig. 5, the take-up lever, its adjusting-lever, and spring, separately.

The frame-work A, shuttle-lever *b*, forked upright lever *c* to move it, cam *d* to actuate the forked lever, rotating needle-bar-actuating shaft *e*, fulcrum-points *f*, and feed-bar *g* are and may be of usual construction.

The feed-actuating lever *h* has its fulcrum on the same pin or stud, *i*, which serves as a fulcrum for the shuttle-lever *b*. This pin has on it a conical or wedge-shaped bushing, *j*, which enters a conical seat in the shuttle-lever, the outer or larger end of the bushing being acted upon by the feed-actuating lever *h*, pressed in contact therewith by an adjusting-screw, *k*. The outer end of the washer *j* is rounded, as is also the under side of the head of the screw *k*, so that the said feed-lever *h* so held may have its outer end moved in a more or less elliptical path. Wear between the said levers and their supporting parts may be compensated for by moving the screw *k* and conical bushing *j*.

The rear end of lever *h* is loosely engaged or connected with the lower end of an upright lever, *l*, provided at its upper end with a horizontal shoulder, 2, and an upright arm, 3, at right angles thereto. (See Fig. 3.) At its lower end the said lever *l* has a shoulder, 4, to strike against the rear end of lever *h* at its upper side, (see Fig. 1,) and the said lever *l* is slotted centrally at 5, (see Fig. 3,) to fit loosely the laterally-extended portion *c'* of the upright lever *c*, the lever *l* rocking or vibrating and sliding vertically, or nearly so, on the said portion $c'$ as a fulcrum as the said lever $l$ is moved by the feed-cams $m$ $n$.

The feed-cam $m$, which acts on the part 2 of the lever $l$ and depresses it to depress the rear end of the lever $h$ and raise its forward end, and with it the feed-bar $g$, is secured to the shaft $e$ by a suitable set-screw, and is shown in Fig. 1 as made hollow to receive within it the front or small end of the forward-moving feed-cam $n$, as the latter is moved toward the front of the machine to lengthen the feed-stroke and stitch, such hollow cam $m$ materially adding to the compactness of the parts. Yet I desire it to be understood that the cam $m$ may, if desired, be made solid, and as a continuation of the cam $n$.

The hollow tapering sleeve-like cam $n$ is connected with the needle-bar-operating shaft, by a pin, 7, extended through the said cam at its larger end, and through a longitudinal transverse slot, 8, in the said shaft. This slot 8 of the shaft also receives in it, at the rear of the cam $n$, a gib, $p$, and one side of the gib is acted upon by the inner end of the feed regulating or adjusting screw $r$, extended longitudinally through the rear end of shaft $e$, as shown in Fig. 1. A spring, $o$, in the hollow-cam $m$, acts upon and keeps the cam $n$ pressed against the gib $p$, and the latter against the screw $r$. The spiral spring $q$ holds the upper part of the lever $l$ up against the cams $m$ and $n$. Adjusting the cam $n$ longitudinally on the shaft $e$ by means of the screw $r$ and gib $p$ will so place the said cam that a part of it having the proper length of radius will act on the arm 3 and vibrate the lever $l$ more or less for a long or short stitch, the said lever vibrating the lever $h$ more or less, and in unison with it. These two cams on the uppermost shaft in the overhanging arm of the machine determine all the movements of the feed. The needle-thread, before entering the eye of the usual needle, is led through the eye or loop at the lower end of the take-up lever $t$, of usual construction, which is commonly acted upon by a spring to keep the lever $t$ pressed toward the left, as in Fig. 4, to take up all the slack possible in the needle-thread. This lever $t$ has its fulcrum at $t'$. The outer end of the spring $u$ is connected with the said lever $t$ a short distance from its fulcrum or pivot. The inner end of this spring $u$ is connected with an adjusting-lever, $w$, on the same center or fulcrum, $t'$. This lever $w$, made of spring-steel, has a projection, $x$, to engage notches of a notched quadrant-shaped holding-bar, $y$. Moving the lever $w$ toward the lever $t$ increases the force of the spring $u$ on the lever $t$ and the force with which it acts upon the needle-thread, and vice versa.

The gib $p$ might be omitted and the screw $r$ be made to bear against a part of cam $n$, but I prefer to retain the said gib.

I claim—

1. The horizontal rotating needle-bar-actuating shaft $e$, and its longitudinally-adjustable tapering cam, and cam $m$ thereon, combined with the upright lever having the faces 2 3 and shoulder 4, and with the lever $h$ and feed-bar, substantially as described.

2. The horizontal rotating shaft $e$, the hollow cam $m$, spring $o$, and tapering sleeve-cam $n$, combined with the feed-adjusting screw fitted longitudinally in the said shaft, substantially as described.

3. The horizontal rotating shaft, the adjusting-screw $r$, carried thereby, the gib fitted into the slot in the said shaft, and the cam $m$ thereon, combined with the adjustable sleeve-like tapering cam $n$, and with the upright lever actuated thereby to impart movement to the cloth-feeding parts, substantially as described.

4. The bed A and the pivoted shuttle-lever and the pivoted feed-actuating lever, each having its fulcrum to hold the said levers fixed with relation to the said bed, combined with two vertical levers, one to vibrate the shuttle-lever and the other to vibrate the feed-actuating lever, and with the main shaft $e$ and cams to operate the said vertical levers, as and for the purposes described.

5. The adjustable sleeve-like tapering cam and cam $m$, combined with the upright lever $l$, slotted, as described, to both rock and slide on its fulcrum, as set forth.

6. The horizontally-vibrating feed-actuating lever, the upright vertical lever connected therewith, shaft $e$, and suitable cams to vibrate the said upright lever, combined with the horizontally-vibrating shuttle-carrying lever and the stud $i$, arranged to serve as a fulcrum for each of the said levers, substantially as and for the purpose described.

7. In a sewing-machine, the horizontally-vibrating shuttle-actuating lever $b$, combined with the feed-bar-moving lever $h$, both mounted on the same pin, $i$, substantially as described.

8. The horizontally-vibrating shuttle-actuating lever $b$ and feed-bar-moving lever $h$, having their fulcra on the same pin, $i$, combined with the adjustable conical bushing $j$ and the screw $k$, substantially as described 9. The take-up lever and springs $u$, connected therewith, combined with the lever $w$, also connected with and adapted to move the said spring to increase or decrease its effect on the take-up lever, substantially as described.

EDDY T. THOMAS.

Witnesses:
G. W. GREGORY,
B. J. NOYES.